(12) United States Patent
Reber et al.

(10) Patent No.: US 6,353,665 B1
(45) Date of Patent: Mar. 5, 2002

(54) METHOD FOR CONTROLLING TELECOMMUNICATION SERVICES

(75) Inventors: Ulrich Reber, Planegg; Can Davutoglu, München, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/462,536
(22) PCT Filed: May 3, 1999
(86) PCT No.: PCT/DE99/01302
§ 371 Date: Jan. 10, 2000
§ 102(e) Date: Jan. 10, 2000
(87) PCT Pub. No.: WO99/59348
PCT Pub. Date: Nov. 18, 1999

(30) Foreign Application Priority Data

May 8, 1998 (DE) .......................................... 198 20 685
May 8, 1998 (EP) .............................................. 98108450

(51) Int. Cl.[7] .......................... H04M 3/42; H04M 7/00; H04Q 3/00
(52) U.S. Cl. ............................. 379/201.12; 379/221.09; 379/221.12
(58) Field of Search ....................... 379/201.01, 201.12, 379/221.08, 221.09, 221.12, 230

(56) References Cited

U.S. PATENT DOCUMENTS 5,430,719 A    7/1995  Weisser, Jr. .................. 370/389
5,438,568 A *  8/1995  Weisser ....................... 370/389
5,517,562 A    5/1996  McConnell ............. 379/201.03
5,701,301 A * 12/1997  Weisser ....................... 370/428

FOREIGN PATENT DOCUMENTS

WO    WO 97/07637    2/1997    ............ H04Q/3/00

OTHER PUBLICATIONS

Implementing in Functional Entities, on Top of Distributed Operating System, Fujinaga et al.

Impact of New Services on SCP Performance, Bray, pp. 0241–0247.

Q.1211 ITU–T, General Recommendations on Telephone Switching and Signalling, Intelligent Network, Introduction to Intelligent Network Capability Set 1, 03/93.

Q.1214, Intelligent Network, Distributed Functional Plane for Intelligent Network CS–1, 10/95.

* cited by examiner

Primary Examiner—Harry S. Hong
(74) Attorney, Agent, or Firm—Schiff Hardin & Waite

(57) ABSTRACT

A method for controlling telecommunication services in a telecommunication network wherein both the telecommunication services that a service control point administers as well as the service switching points are allocated to specific network operators and an additional check of the network operator is proposed, which is implemented by the SCP before a service call is further-processed.

8 Claims, 6 Drawing Sheets

METHOD FOR CONTROLLING TELECOMMUNICATION SERVICES

BACKGROUND OF THE INVENTION

1. Field of the Invention

The present invention is directed, generally, to a method for controlling telecommunication services in a telecommunication network and, more specifically, a method for controlling such telecommunication services wherein both the service switching points and the telecommunication services that a service control point administers are allocated to specific network operators.

2. Description of the Prior Art

Given telecommunication services, which also are often called multi-value services, what are involved are services offered in addition to mere data transmission; for example, different types of call rerouting or call forwarding, charge models such as payment by credit card, charge transfer, premium call or VPN (virtual private network).

A technology is, accordingly, employed that is described in the series of standards Q.1200 ff of the ITU—what is referred to as the intelligent network IN. See Q.1211, ITU-T, General Recommendations on Telephone Switching and Signaling, Intellegent Network, Introduction to Intelligent Network Capability Set 1, March 1993.

What is thereby involved is an architecture that can be placed over an existing fixed network or a mobile radio telephone network.

A typical IN architecture contains the following components:

Service Switching Point, SSP

Service Control Point, SCP

Service Management System, SMS

Service Creation Environment, SCE.

The SSP or service switching point forms both a part of the switching node and the interface to the SCP-based IN call control. It recognizes when additional IN functionalities are required and calls the SCP as needed via a signaling network that usually employs a specific protocol (INAP, IN Application Protocol) on the common channel signaling system No. 7.

The SCP is a central processing unit that contains what are referred to as the service logics for telecommunication services and features. After reception of an inquiry of an SSP (see above), the SCP determines the requested service and directs the call to the suitable application. The call is processed and the SSP is informed about the next steps to be implemented; for example, setup a connection to a specific number, abort the connection or effect charging.

The SMS offers support for the application programs of the SCP; for example, the establishment of new telecommunication services, the log on and log off of subscribers and many others. The SMS cooperates closely with the other components of the IN.

The SCE is available for designing new telecommunication services. Its most important job is to make tools available for fast design and testing of new services and features. A library of building blocks is available for this purpose (what are referred to as service independent building blocks, SIB).

Up until now, each telecommunication network operator had his own IN system that he utilized in his own network. Due to increasing fragmentation of the telecommunication market, however, more and more small vendors have been recently arising; for example, what are referred to as "city carriers" in large cities. For these, too, the telecommunication services are an important factor in order to offer added value to the users.

However, the barrier is very high for these small operators since the classic IN components are expensive to acquire and operate. Moreover, highly qualified personnel must be available for operations.

One solution for avoiding this is to divide the IN resources; i.e., essentially SCP, SMS and SCE, what is referred to as "shared IN". This makes it technologically possible to make resources of a single IN system available to a plurality of network operators.

An object of the present invention, therefore, is to make exactly those telecommunication services of one's own network operator available to each customer of a network operator in a shared IN system.

SUMMARY OF INVENTION

Pursuant to the present invention, therefore, an additional check is implemented by the SCP before a service call is further-processed.

It is thereby taken into consideration that both the telecommunication services that a service control point (SCP) administers as well as the service switching points (SSP) are respectively allocated to specific network operators. A subscriber that employs the telecommunication network of an operator also should be able to access only the telecommunication services of this network operator.

When the called service belongs to the same network operator as the service switching point from which this service call came, the processing by the SCP is implemented in the same way as previously. When, however, this is not the case, then the service call is not implemented.

As a result of the inventive check, the shared IN system becomes more dependable against disturbances and incorrect operations by the network operators who are not as technically trained in this field. It is also assured that the charging of the telecommunication services (with what are referred to as AMA tickets, automatic message accounting) can be correctly implemented.

There are a number of possibilities of how the control point can identify the affiliation of the service switching points to a network operator. First, an operator identifier can be co-supplied with every service call as an additional parameter, wherein it is supplied by the service switching point. The control point, however, can store this information for instance, in the form of lists in which service operators belonging to the service switching point are allocated.

It is necessary in some telecommunication services for an initialization message to be previously sent to the service switching point. This is true, for example, of what is referred to as "televoting"; i.e., the mere counting of the connection setup attempts to a number. In a conventional IN system, the initialization message (activate service filtering) is sent to all service switching points in the telecommunication network. In a shared IN system, it is then advantageous when only those service switching points that belong to the network operator offering the service receive this initialization message. The control point seeks the service switching points allocated to the network operator from a stored list in accordance with the present invention and sends the initialization message to precisely only these points.

A further possibility of employment is what is referred to as "call gapping", which is a service that makes it possible to determine the number of service calls to be sent through by the service switching point. This is often employed in order to reduce a high load of, for example, the control point SCP. The calculations, which are thereby centrally performed, however, likewise must be implemented operator-specific in a shared IN system. Further, the initialization message (CALLGAP, Q.1214) here is likewise only sent to the service switching points of the appertaining network operators. See Q.1214 Intelligent Network, Distributed Functional Plane for Intelligent Network CS-1, October 1995.

Additional features and advantages of the present invention are described in, and will be apparent from, the Detailed Description of the Preferred Embodiments and the Drawings.

DETAILED DESCRIPTION OF PREFERRED EMBODIMENTS

Figure 1:
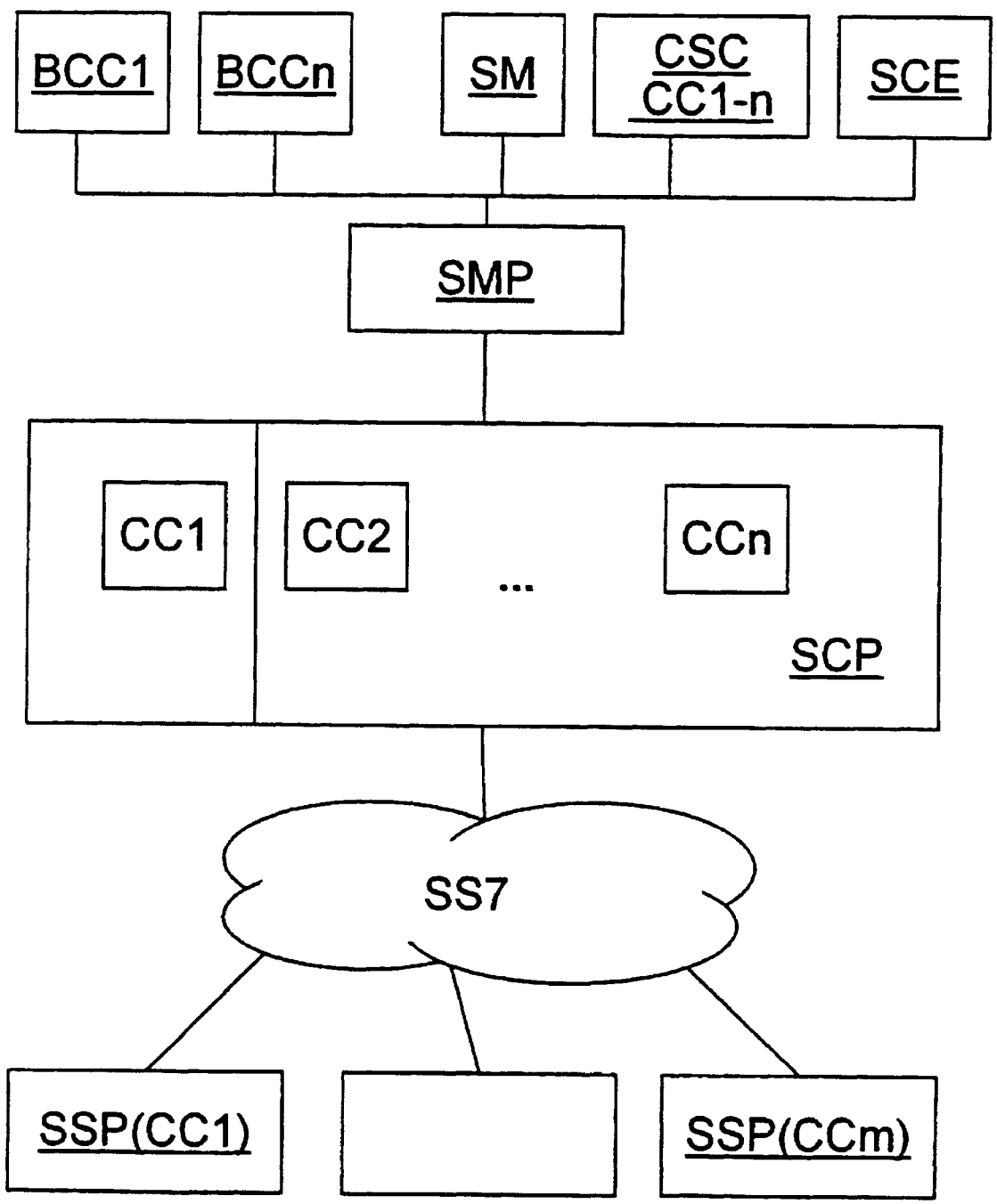
FIG. 1 shows the underlying structure of a shared IN system.

FIG. 1 describes an exemplary, shared IN system in terms of its structure with the essential elements. Shown at the bottom are the service switching points SSP that are allocated to different network vendors (what are referred to as city carriers CC1 through Ccm). The connection, as already presented in the introduction, is connected via a communication network SS7 (i.e., for example, central channel signaling system No. 7) to one another and to the control point SCP. The control point itself is handled by an IN operator (not shown in the FIG. 1) and contains the components for the individual network operators "city carrier" CC1, CC2, Ccn that can be least to these.

Belonging to the control point, further network elements are operated by the IN operator (a partial description of this already being presented in the introduction):

the service management point, SMP, also referred to as service operating system, since functions for the service management are made available here;

charging, billing, and customer care, BCC1; BCCn service management, SM for the administration of the service programs and the appertaining resources;

service creation environment, SCE, for developing new IN services and service building blocks;

support centers for network operators, customer support center, CSC1–n.

Figure 2:
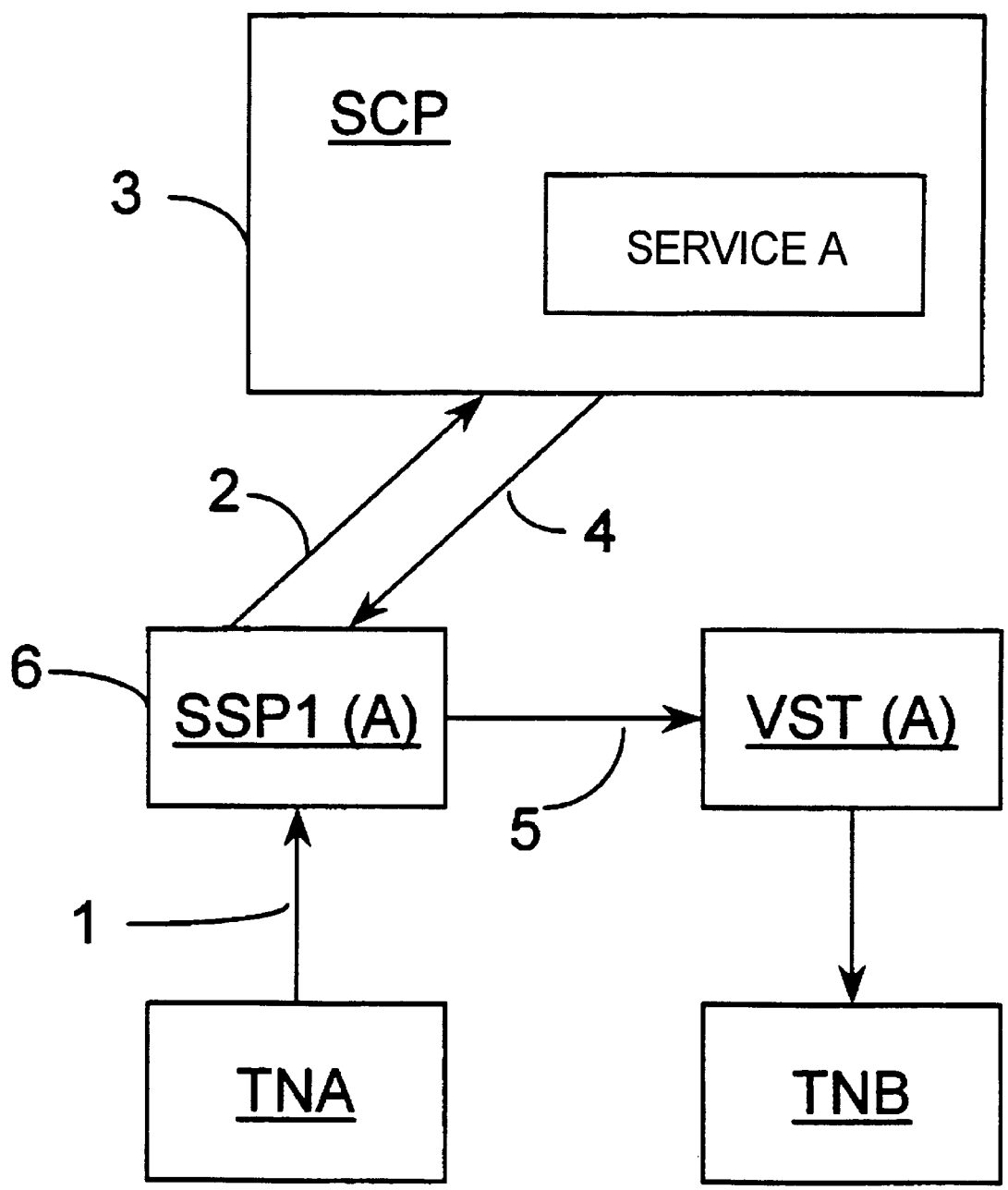
FIG. 2 shows an IN service call in a classic IN system.

FIG. 2 shows an IN service call as implemented in a classic IN system, i.e., all components belong to the same network operator A. A subscriber dials a (service) No. 1, for example 0147-1234. This call is [ . . . ] by the service switching point SSP1 (A). This service likewise belongs to the network operator A. The service switching point routes the request to the control point SCP2 which, with the assistance of the service programs service A, determines the next executive steps, 3.

In the described case, a call number conversion and the service switching network is called for 4, and a connection is made to a subscriber TMB, 5 (via the switching center to which the subscriber B is connected, VST (B)). Finally, the charging is implemented; i.e., what is referred to as an AMA ticket is written by the service switching point, 6. Since all components and the service belong to one another operator, further checking is not necessary.

Figure 3:
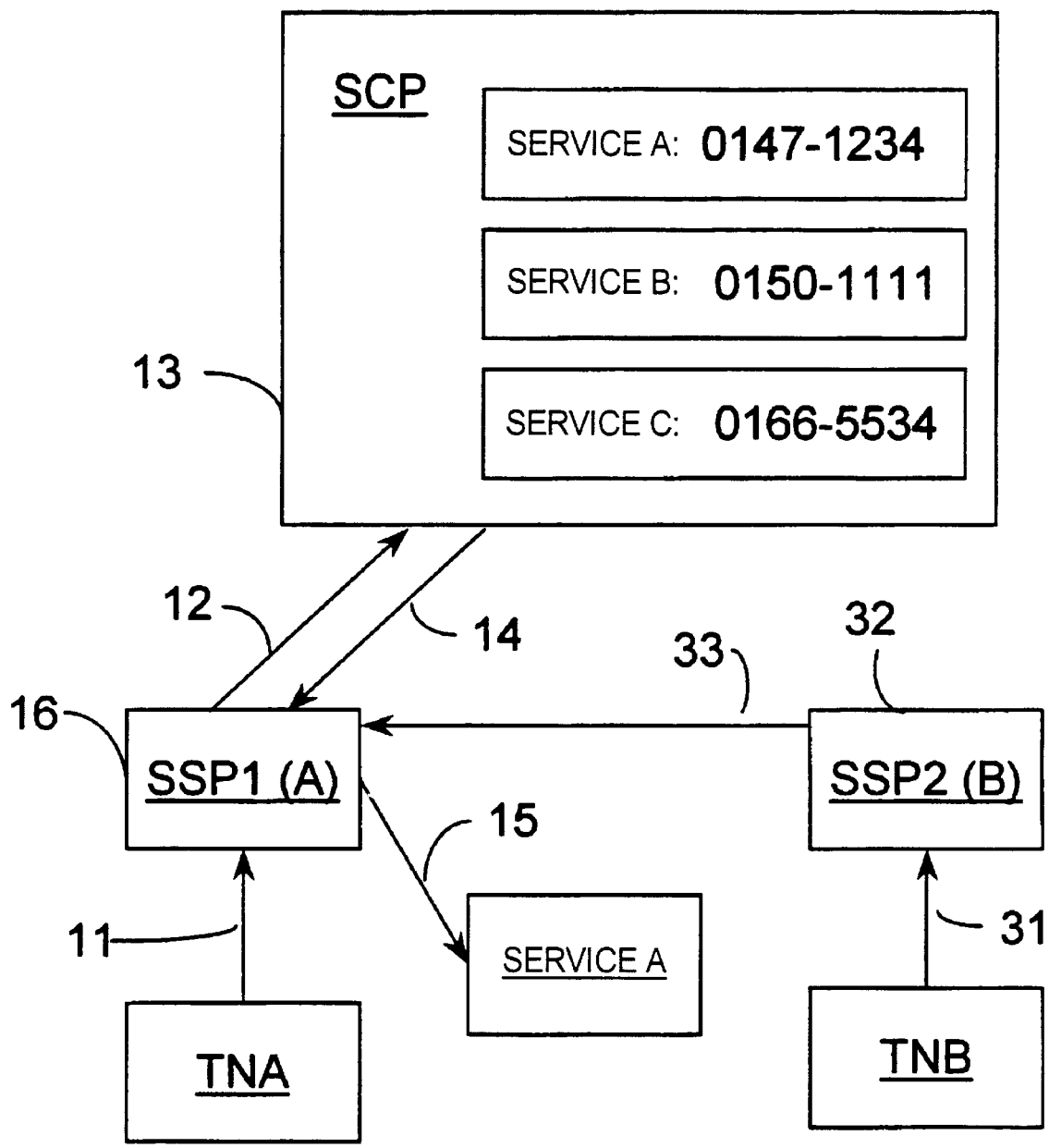
FIG. 3 shows an IN service call in a shared IN system, wherein the unallowed service call is routed to the network operator belonging to the service.

FIG. 3 shows a shared IN system that is employed by a plurality of network operators A, B, C. These network operators have respective services: Service A for network operator A, Service B for network operator B and Service C for network operator C.

When a subscriber TNA calls a service of the network operator A via a service switching point SSP1 (A) of the network operator A, this is handled just like in the case of a service call in a classic IN system. This has already been described in connection with FIG. 2. The service A is, thereby, again called with the call number 0147-1234; reference characters 11 through 16 correspond to the respective reference characters 1 through 6 from FIG. 2. The number conversion occurs onto the service A.

In the critical case, as shown at the right-hand side in FIG. 3, a subscriber B likewise calls the service A:0147-1234 of the network operator A, 31, via a service switching point SSP2 (B) of the network operator B. The service numbers are centrally assigned to the operators of the network operators by the IN. After recognition of the unaffiliated service number, a correct behavior of the service switching point SSP2 (B) is to not forward the service call to the SCP. The service call, instead, is routed 32 to a service switching point SSP1 (A) belonging to the network operator A. It is then possible that the service is offered and built via the network operator A or is rejected.

Figure 4:
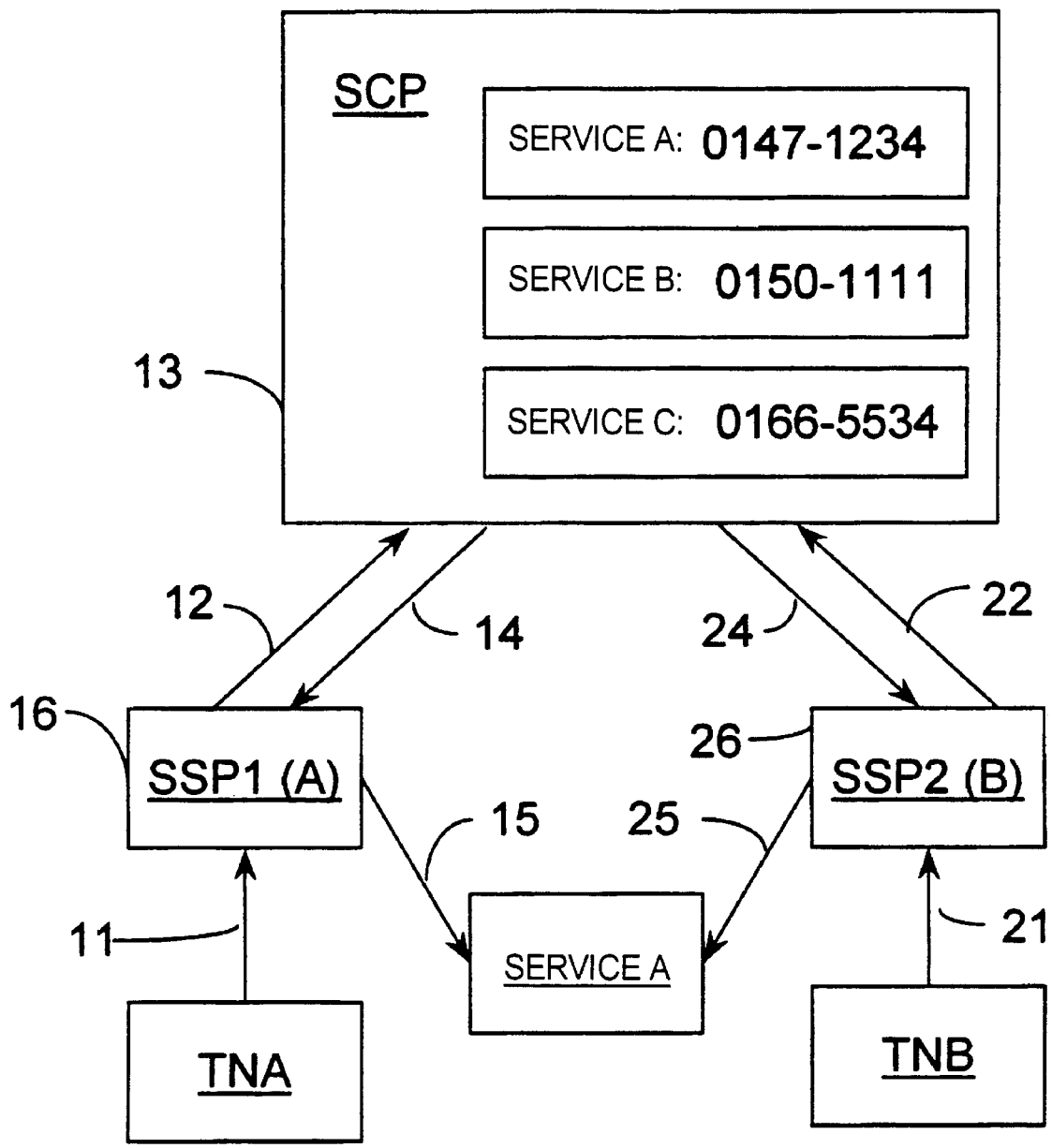
FIG. 4 shows an IN service call in a shared IN system, wherein the problem to be solved arises.

FIG. 4 shows the same shared IN system as FIG. 3 that is employed by a plurality of network operators A, B, C. These network operators have respective services: Service A for network operator A, Service B for network operator B and Service C for network operator C. The traditional service call as already described in FIGS. 2 and 3 is again shown at the left-hand side.

The right-hand side shows a service call 21 of a service of the network operator A: 0147-1234 from the subscriber TNB via a service switching point SSP2 (B) of the network operator B. The service switching point, in contrast to FIG. 3, now behaves in a faulty way and handles the call just like a call of its own service, wherein it starts an inquiry to the SCP, 22. The SCP accepts this service request and handles it just like that, 12, from SSP1 (A) of the network operator A, 13. An answer back with the call number conversion, 24, is reported to the SSP2 (B) and a connection is setup to the service A, 25.

What is, thereby particularly critical is the charging, 26. The AMA ticket is; thereby written by the service switching point SSP2 (B) of the network operator B to whom service A does not belong at all. As a result the competing network operator makes money (for example, from the subscriber TMB) for a performance that is actually not even his.

Figure 5:
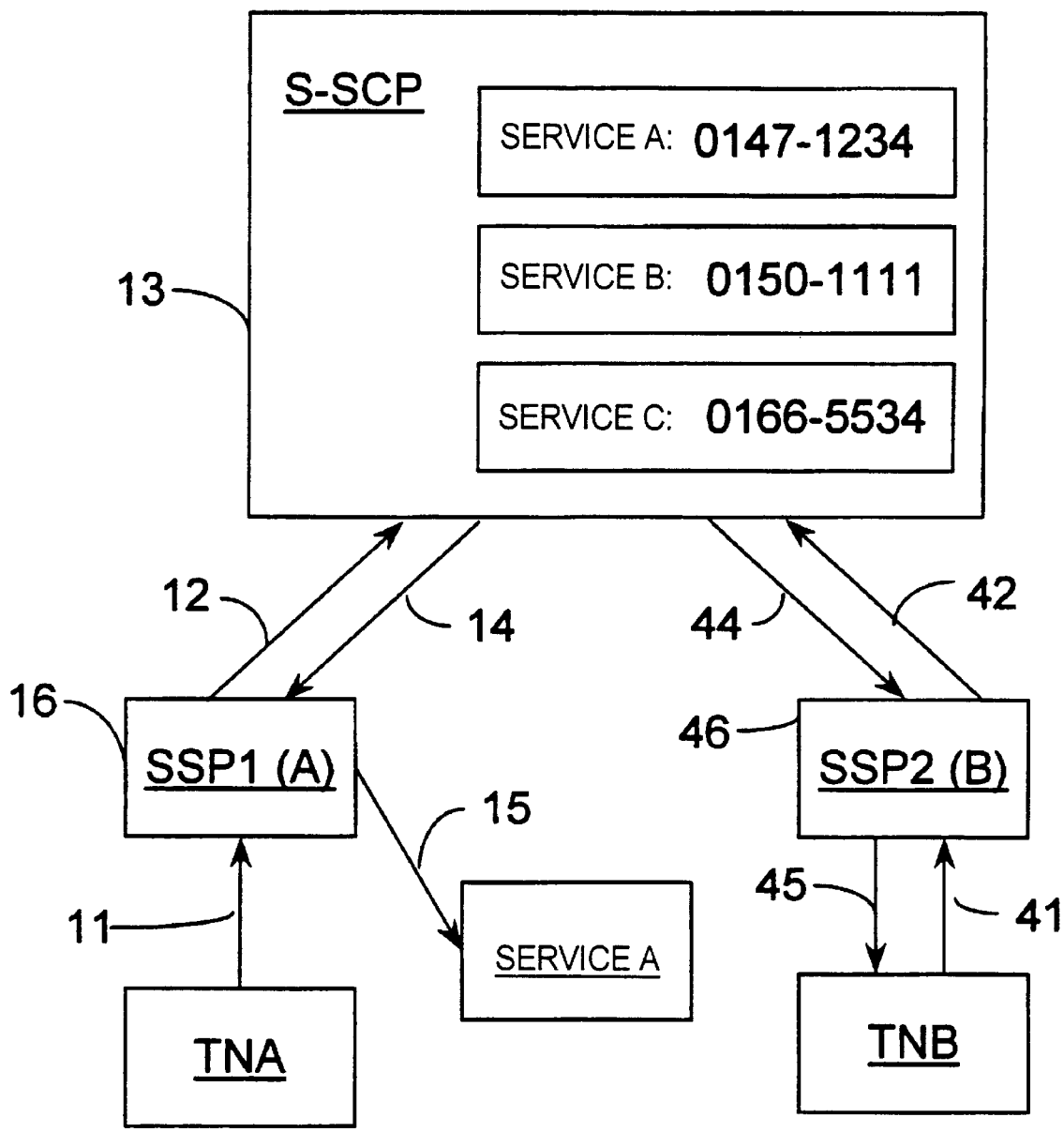
FIG. 5 shows the inventive handling of a call of a telecommunication service of a network operator A by a subscriber of the network operator B.

FIG. 5 then shows the handling of the above-described problematical case with the inventive method. In comparison, a traditional service call without collision of various network operators is again shown at the left-hand side. Reference numerals 11 through 16 correspond to those of FIGS. 1 through 4. The subscriber TNB again dials the service A: 0147-1234 of network operator A. However, it is now done via the service switching point SSP2 (B) of the network operator B, 41. The service call is routed to the control point S-SCP of the shared IN system, 42. The S-SCP, in turn determines the service A:0147-1234 of the network operator A. Now, however, the S-SCP also checks to see which network operator B owns the service switching point SSP2 (B) and compares whether it is a matter of the same network operator. This check can occur by a comparison of the SSP2 (B) addressed to a list, i.e. either: the address is in the list of the service switching points of the network operator A or which network operator has the service switching point SSP2 (B) allocated to him. Another possibility would be to co-forward a network operator identifier explicitly in the service call. When it is found that no coincidence is present, then the IN system writes a fraud record. The execution of the service is enabled, and the SSP2 (B) is informed about the event, 44, this then implementing corresponding actions. This can be an abort of the connection (release, 45) or an announcement with the indication that this service is not available or regarding which network operator offers this service or the like.

Figure 6:
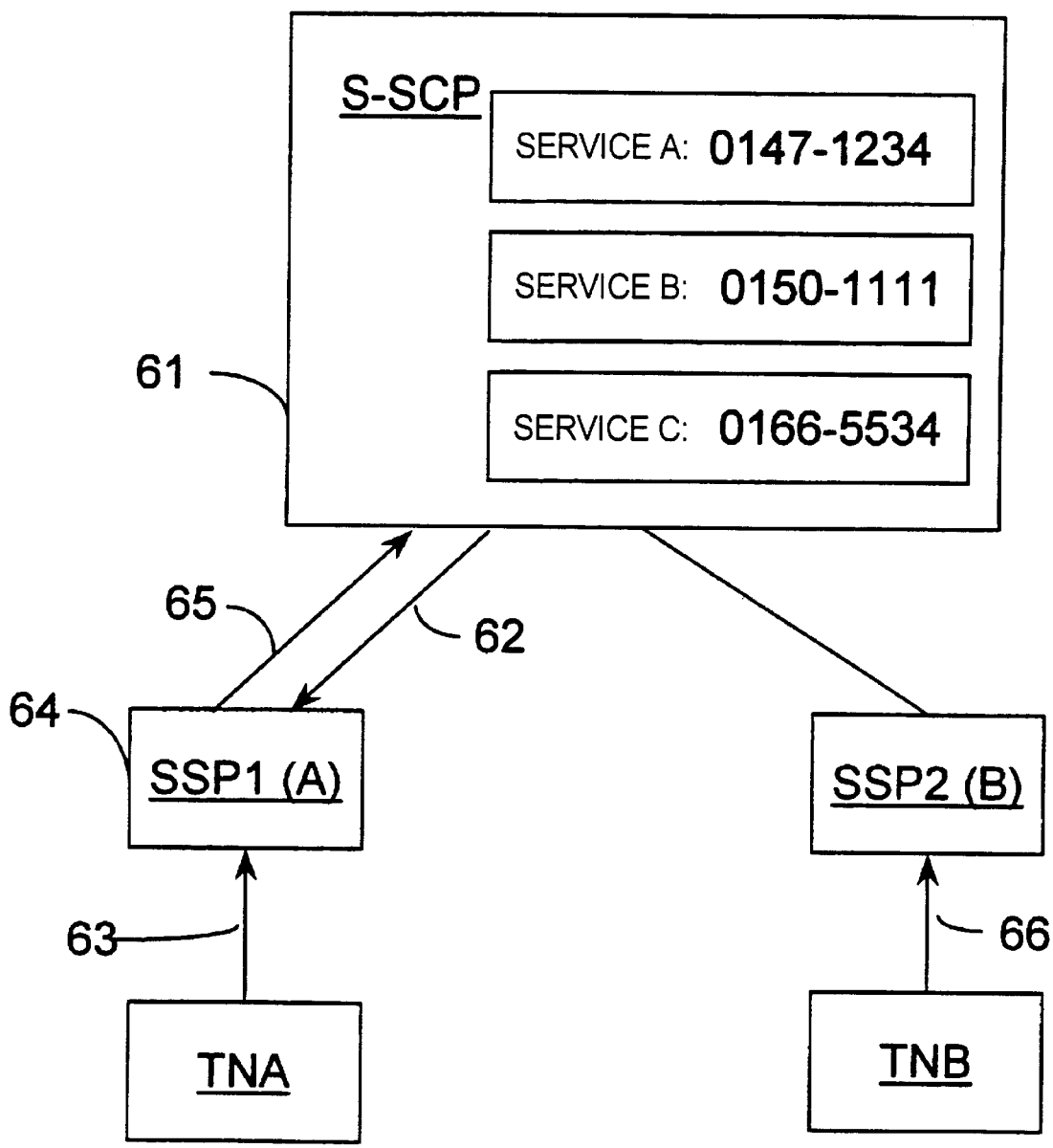
FIG. 6 shows the inventive procedure when an initialization message from the service control point SCP is necessary to the service switching element SSP.

FIG. 6, finally, also shows those services wherein the service is enabled at all by an initialization message. Included here, for example, is the service "televoting" (also called "service filtering"); i.e., the counting of calls to a specific number in a specific time span. This has been prone to being employed in television transmissions, where television viewers can vote about alternatives by dialing different telephone numbers. These calls, however, are not connected by the service switching point but are merely counted. In turn, that are released after playing a brief message.

The S-SCP receives a request from the operator of the IN system (for instance, via the SMS) to establish the aforementioned service. This, however, should only be accessible for subscribers of the network of network operator A. The S-SCP thus sends the initialization message 62 (activate service filtering) only to service 15 switching points of the network operator A. It is thereby advantageous when the S-SCP has stored lists with an allocation of the SCP addresses to the network operators. When the subscriber TNA of network operator A then calls the service, 63, then his call is counted as described above and the event is reported, 65, to the S-SCP at a suitable point in time. When, however, a subscriber TNB at a service switching point SSP2 (B) that does not belong to the network operator A attempts this service call, 66, then his call is not counted and the plurality of these misdirected calls is not reported to the S-SCP. It is possible that he receives a corresponding message or that the call is redirected, in the way described in FIG. 3. The procedure described for televoting also can be employed for what is referred to as call gapping; i.e., the reduction of service calls to be placed through. Here, too, the initialization message must be sent to the service switching points of the appertaining network operator after a corresponding calculation.

Although the present invention has been described with reference to specific embodiments, those of skill in the art will recognize that changes may be made thereto without departing from the spirit and scope of the invention as set forth in the hereafter appended claims.

What is claimed is:

1. A method for controlling telecommunication services in a telecommunication network which is composed of network elements and which is operated by at least two network operators, the method comprising the steps of:

unambiguously allocating to one of the network operators some of the network elements for service switching;

unambiguously allocating to at least one of the network operators every offered telecommunication service;

designating at least one network element as a controlling network element for control of the telecommunication services;

checking, via the controlling network element, whether a service-switching point is allocated to the same network operator as a telecommunication service via which the service-switching point is called; and implementing further actions for the called telecommunications service dependent on a result of the step of checking.

2. A method for controlling telecommunication services in a telecommunication network as claimed in claim 1, the method further comprising the step of:

storing information in the service control point about the allocation of service switching points to network operators.

3. A method for controlling telecommunication services in a telecommunication network as claimed in claim 1, the method further comprising the step of:

determining, via the service control point, information about the allocation of service switching points to network operators from the service request.

4. A method for controlling telecommunication services in a telecommunication network as claimed in claim 1, the method further comprising the steps of:

sending a service request to a service switching point of a network operator via a subscriber of the telecommunication network;

communicating the service request to the service control point via the service switching point;

checking, via the service control point, to see which first network operator the transmitting service switching point is allocated and to which second network operator the requested service is allocated; and rejecting the call of the telecommunication service when the check shows that the first network operator is different from the second network operator.

5. A method for controlling telecommunication services in a telecommunication network as claimed in claim 1, the method further comprising the step of:

sending an initialization message to service switching points, upon activation of a telecommunication service by the service control point, wherein the initialization message is only sent to those service switching points that are allocated to the network operator or to operators offering the telecommunication service.

6. A method for controlling telecommunication services in a telecommunication network as claimed in claim 5, the method further comprising the step of:

counting the plurality of incoming service calls via the service switching points that have received the initialization message.

7. A method for controlling telecommunication services in a telecommunication network as claimed in claim 5, the method further comprising the step of:

making calculations about the traffic load of the individual telecommunication services wherein the calculations are implemented network operator-dependent.

8. A method for controlling telecommunication services in a telecommunication network as claimed in claim 7, the method further comprising the step of:

allowing only a predetermined portion of the service calls via the service switching points that have received the initialization message.

* * * * *